United States Patent [19]

Haugerud

[11] Patent Number: 4,712,184

[45] Date of Patent: Dec. 8, 1987

[54] COMPUTER CONTROLLABLE ROBOTIC EDUCATIONAL TOY

[76] Inventor: Albert R. Haugerud, 1544 Hillside Dr. Southeast, Issaquah, Wash. 98027

[21] Appl. No.: 649,862

[22] Filed: Sep. 12, 1984

[51] Int. Cl.$^4$ .................... G06F 15/46; G09B 19/00
[52] U.S. Cl. .................................. 364/513; 364/900; 434/118; 446/95; 446/454; 446/456; 901/23; 377/16
[58] Field of Search .............. 364/513, 200, 900; 901/23; 377/16; 434/118; 446/95, 454, 456

[56] References Cited

U.S. PATENT DOCUMENTS

| | | | |
|---|---|---|---|
| 3,689,892 | 9/1972 | Glenn et al. | 364/513 |
| 3,975,835 | 8/1976 | Reichman | 434/118 |
| 4,107,595 | 8/1978 | Campe | 377/2 |
| 4,109,398 | 8/1978 | Hida | 46/39 |
| 4,379,335 | 4/1983 | Kirsch et al. | 364/513 |
| 4,548,584 | 10/1985 | Townsend | 434/118 |

OTHER PUBLICATIONS

"Introduction to Microprocessors: Software, Hardware, Programming," L. A. Leventhal, ©1978, pp. 44-45, 354, 358-369, 582-583.
"BBC Buggy," *Your Computer*, vol. 3, No. 4, Apr. 1983, pp. 50-53.
BBC Buggy Assembly and Operating Manual, ©1983 BBC/Economatics.
"The Robotic Device That Can Do Some Amazing Things," Economatics Publication.
"Newt: a Mobile, Cognitive Robot," Byte, vol. 2, No. 6, pp. 30-45, 6-1977.

*Primary Examiner*—Jerry Smith
*Assistant Examiner*—John R. Lastova
*Attorney, Agent, or Firm*—Ward Brown; Robert W. Beach

[57] ABSTRACT

An interface receives a high and low voltage signal from a single contact or pin of an output port of a multipurpose microcomputer and uses such signal to control the electrically-powered movement or action of a robot as determined by the programming of the microcomputer. The robot has a sensor connected to the interface and detecting whether or not a preselected condition exists at the robot. The interface sends a high and low voltage input signal to a second single contact or pin of the microcomputer port to communicate the condition of the robot sensed by the sensor. The robot is designed and constructed by the user from interchangeable parts, and the user writes essentially all of the computer programming in a simplified language. By a series of experiments, the student learns computer terminology and programming and robotic technology.

9 Claims, 14 Drawing Figures

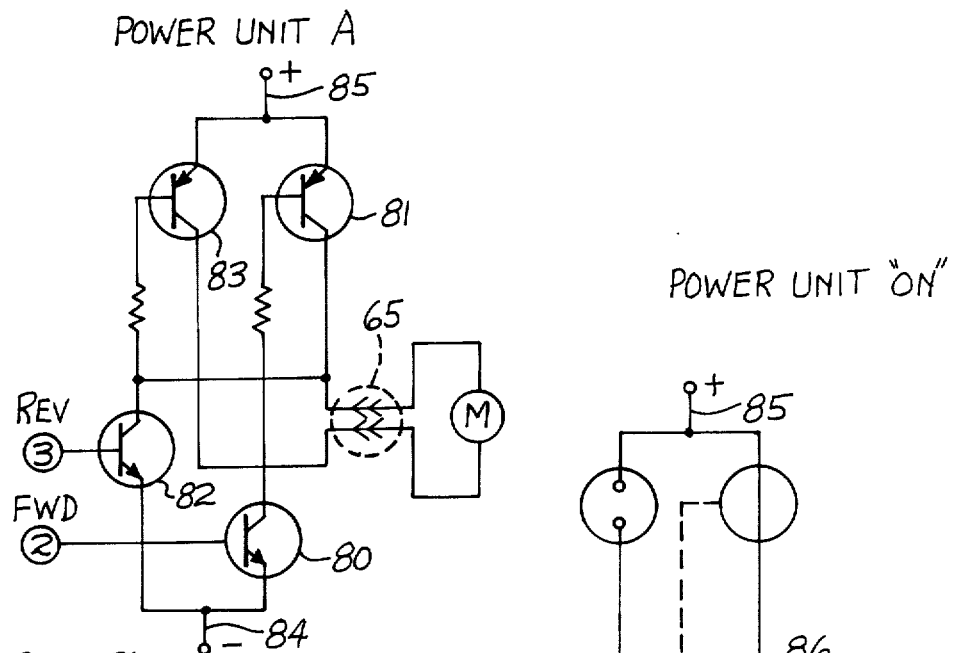
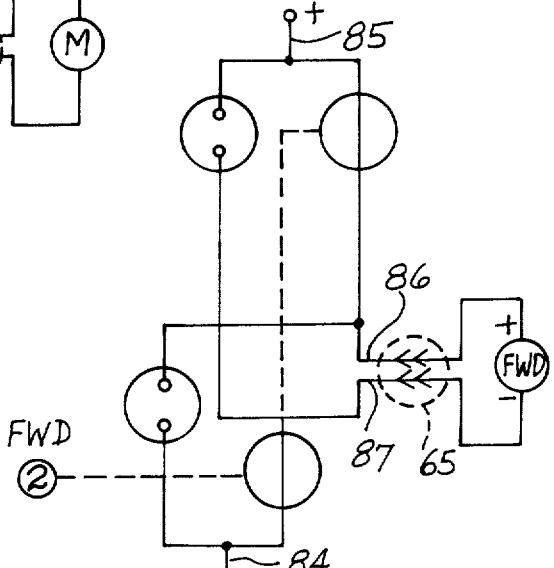
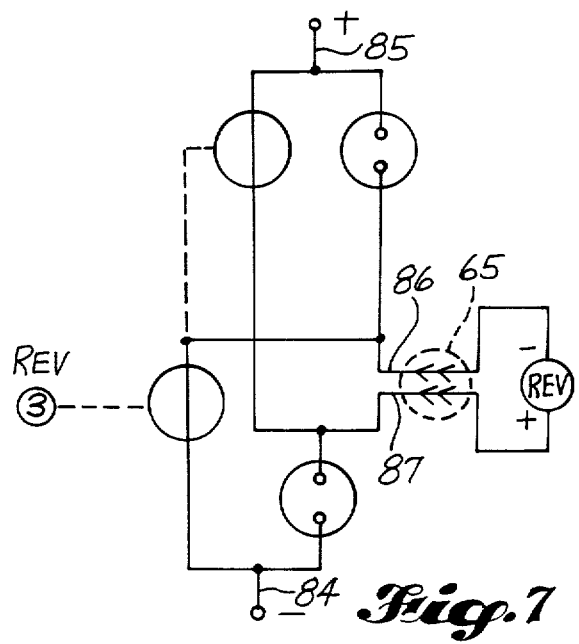

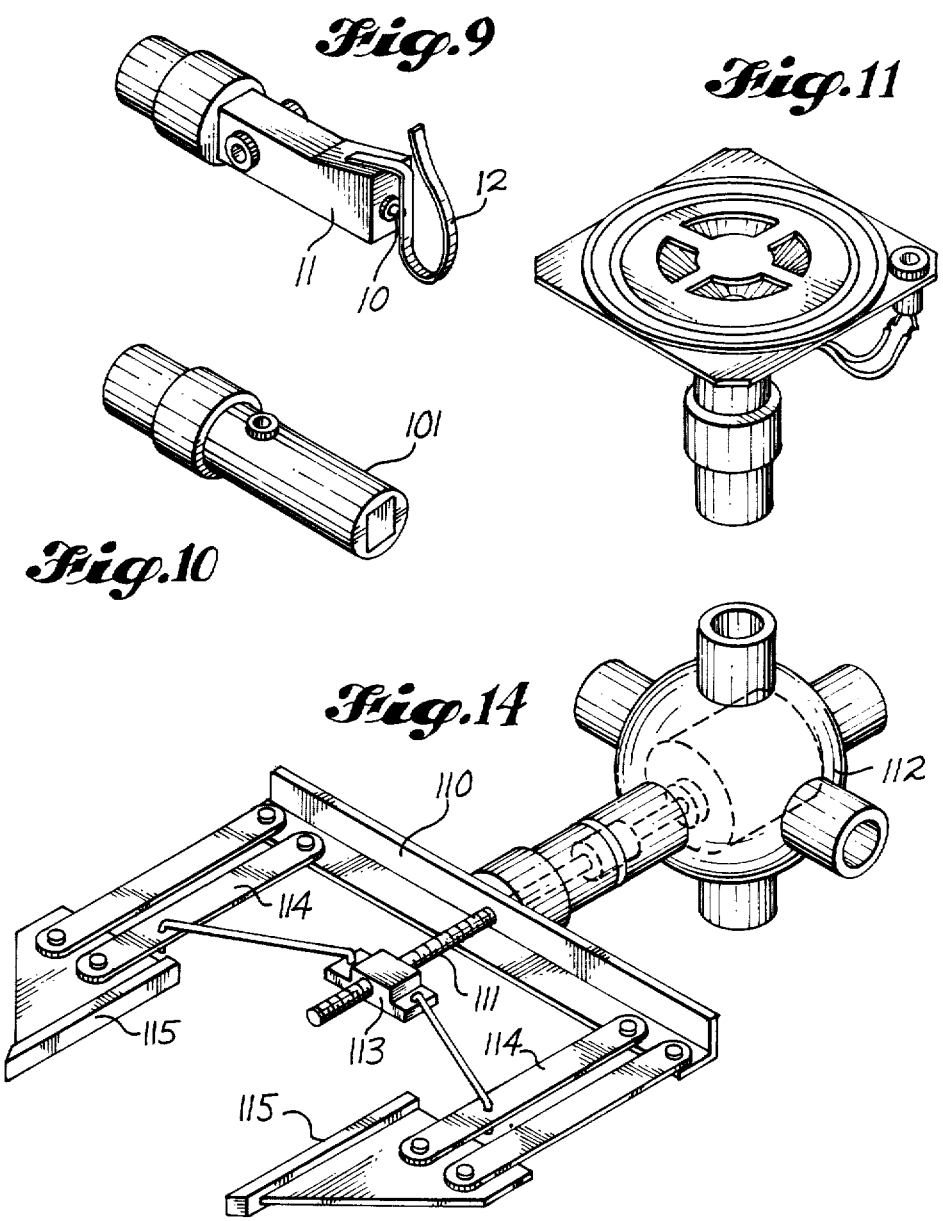

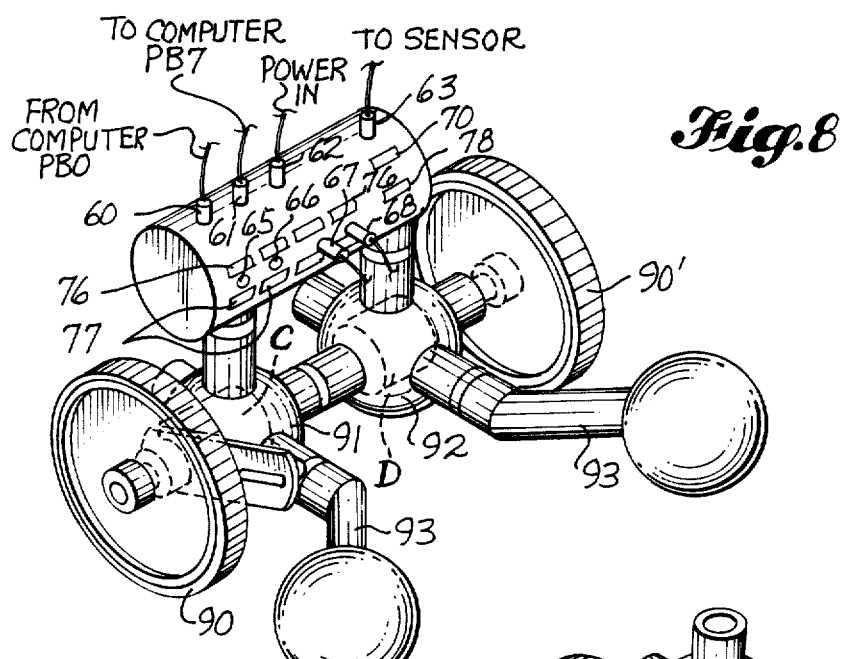
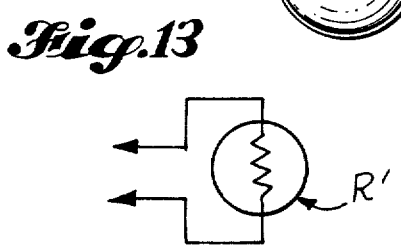
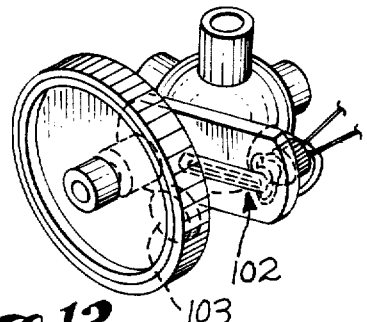

COMPUTER CONTROLLABLE ROBOTIC EDUCATIONAL TOY

BACKGROUND OF THE INVENTION

1. Field of the Invention

The present invention relates to a robot. More specifically, the present invention relates to a robot which is controlled by an inexpensive home or personal computer programmable by use of simple instructions for teaching computer and robotic technology to a student as the user.

2. Prior Art

Grade school students of the age of 8 to 12 years can be taught to use inexpensive computers for playing games, but little knowledge of the working or programming of the computer is learned by playing the games.

Educational programs have been provided for teaching students various subjects but, again, usually the use of such programs does not teach the students how the computer works or computer terminology or computer programming.

Amusing robot toys have been designed for appeal to children, but the movements or actions of the robots are essentially predetermined and limited in number so that children often lose interest in the robots quickly and do not learn robotic technology by playing with the robots.

SUMMARY OF THE INVENTION

The principal object of the present invention is to provide a device which is attractive to young students and which teaches the students computer terminology and programming and robotic technology.

In accordance with the above object, it is an object of the present invention to provide such a device that is amusing and simple to learn for the inexperienced, but yet still amusing and challenging for the more experienced.

The foregoing objects can be accomplished by providing a computer controllable robotic educational toy of the type described in detail below.

In the preferred embodiment of the invention, the toy uses an inexpensive home or personal computer, a robot essentially designed and constructed by the user from interchangeable parts and an interface component operably connected between the computer and the robot for receiving instructions or information from the computer and for controlling the movement or action of the robot appropriately, as determined by computer programming that can be designed by the user. To simplify the programming, preferably the interface is easily connectable to an output port of the computer to receive a high or low voltage output signal from a single contact or pin of such port. Another pin of the port can be used as an input to communicate a condition of the robot sensed by a sensor, such as its position with respect to an obstacle or how far it has traveled, for example. In one embodiment, any of several different actions of the robot can be actuated by the programming even though all information is conveyed to the interface by a single high or low voltage signal from the appropriate port pin.

BRIEF DESCRIPTION OF THE DRAWINGS

FIG. 5 is a more detailed but still very schematic circuit diagram of one component of the interface of FIG. 4; and FIGS. 6 and 7 are very schematic circuit diagrams corresponding to FIG. 5 illustrating different actuated conditions of such component.

FIG. 8 is a top perspective of an alternative robot that can be used in the computer controllable robotic educational toy in accordance with the present invention, such as with the more complicated interface shown in FIG. 4.

FIG. 9 is a top perspective of the sensor shown in FIG. 1.

FIGS. 10, 11 and 12 are top perspectives of alternative sensors that can be used in the computer controllable robotic educational toy in accordance with the present invention; and FIG. 13 is a very schematic circuit diagram of the sensors shown in FIGS. 10, 11 and 12.

FIG. 14 is a somewhat diagrammatic top perspective of a mechanical claw that can be used on the robot of a computer controllable robotic educational toy in accordance with the present invention.

DETAILED DESCRIPTION

General System Description

The computer controllable robotic educational toy in accordance with the present invention is intended to be used by students, particularly grade school students, to amuse them while educating them in computer terminology and programming and robotic technology. In general, the toy includes a computer, preferably an inexpensive "home" or "personal" computer such as the Commodore 64 computer or the Apple II computer. Such computers typically have an output port, sometimes referred to as the "user port" or the "game port", having several contacts or pins providing high or low voltages corresponding to the values of the bits at predetermined memory addresses of the computer. An interface component receives the output signal from the connector and implements appropriate action of a robot which preferably is designed and constructed by the student using interchangeable parts. The programming of the computer is written by the student.

The interaction of the student required in constructing the robot and programming the computer, and the immediate tangible results observed by the innovative student while experimenting with the robot provide a more amusing, interesting and meaningful educational experience than reading a book or punching computer keys to observe an answer or action on a monitor or television screen, for example.

The Computer

As noted above, the robotic educational toy in accordance with the present invention is used with a microcomputer which preferably is programmable using a simple computer language and which has an input-output port accessible by the user.

Figure 1:
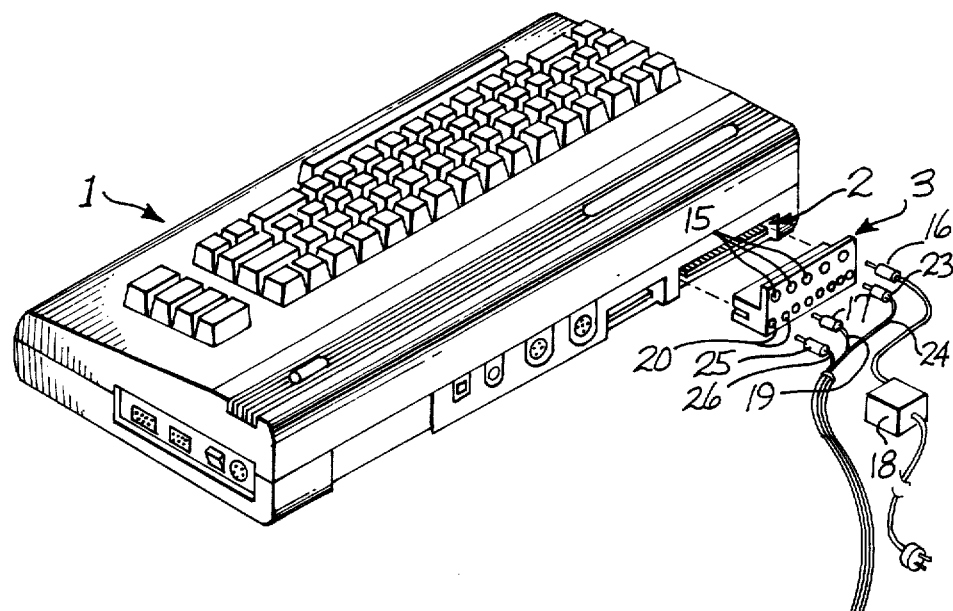
FIG. 1 is a somewhat diagrammatic top perspective of the components of one form of a computer controllable robotic educational toy in accordance with the present invention which includes a computer (shown on a reduced scale), an edge connector for a port of the computer, an interface and a robot in the form of a simple four-wheeled vehicle having a sensor to indicate if the vehicle comes into contact with an obstacle.
Figure 1:
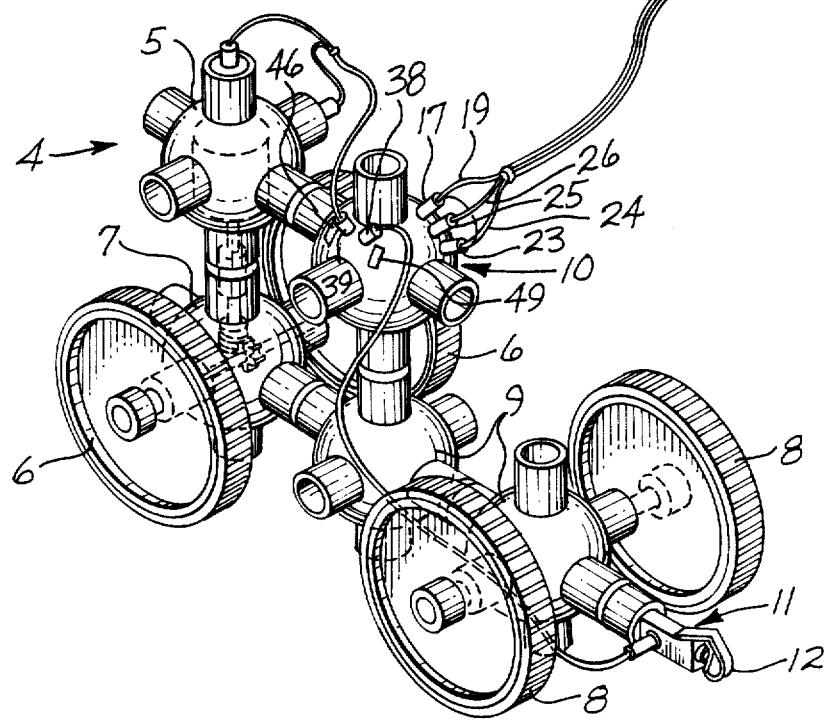

Representative of the type of computer which can be used is the Commodore 64 computer 1, shown in FIG. 1, which is programmable using a simplified "basic" language and which has a "user port" 2 with eight discrete contacts or "pins" accessible by an edge connector 3. The voltage at each pin corresponds to the value of one of the eight bits at a specified memory address. Such address is designated the "port address". For example, a "high" voltage (about 5 volts) at one pin indicates a value of "1" for the corresponding bit at the port address and a "low" voltage (about 0 volts) at the pin indicates a value of "0" for the corresponding bit at the port address.

In the Commodore 64 computer, a different memory address is specified as the "data direction register" which controls whether each of the eight user port pins is used as an "output" or an "input". For a pin designated as an output, the computer sets the voltage at the pin in accordance with the corresponding bit at the port address—high for a bit value of 1 and low for a bit value of 0. If the pin is designated as an input, the computer reads the voltage at the pin and sets the value of the corresponding bit at the port address accordingly. For the purposes of the present invention, a pin designated as an input has a high voltage and, consequently, the corresponding port address bit is 1 unless the pin is grounded, in which case the pin has a low voltage and, consequently, the corresponding port address bit is 0.

In the present invention, the computer is programmed to provide intermittently a high voltage at one of the user port pins to control the operation of a robot 4. Representative robots are described below. As also described below, the computer can be programmed to receive signals from the robot and react depending on the signals received, as determined by the programming.

The Robot

The robot controlled by the computer can take various forms but in the preferred embodiment of the invention is constructed from "Capsela" toy modules of the type described in U.S. Pat. No. 4,109,398. Capsela toy sets are available in the United States from Play-Jour Inc. of New York, New York.

The most common component of a typical Capsela set is a spherical module that can be assembled with other modules to form vehicles, such as the simple "car" robot 4 shown in FIG. 1. The external configuration of each of the Capsela spherical modules is identical to the external configuration of the other modules, but the internal construction varies widely.

The robot used in the present invention has at least one electrically-powered action. For the car shown in FIG. 1, the top rear module 5 contains a small direct current motor having a drive shaft operatively connected to the car rear wheels 6 through the bottom rear module 7 containing simple reduction gearing. The car front wheels 8 are supported by modules 9 connected to and extending forward from the reduction gearing module 7.

A key component of the robot is the interface 10 which is conveniently carried inside a modified Capsela spherical module connectible to the other modules such as shown in FIG. 1. In the preferred embodiment of the present invention, the interface receives the high and low voltage signal from a selected output pin of the user port and controls the flow of electrical power to the motor module 5.

In addition, the robot can include a sensor for detecting whether or not a preselected condition exists at the robot. Preferably the sensor is mounted on one of the Capsela modules. In FIG. 1, the sensor 11 projects forward from the front module 9 carrying the front wheels 8 of the robot and is a simple switch normally open but closed either manually by pressing the lever 12 or by contact of the lever with an obstacle. Closing of the switch is detected by the interface 10 which sends a signal to a selected input pin of the computer user port by connecting such pin to ground.

Edge Connector

Figures 2, 3:
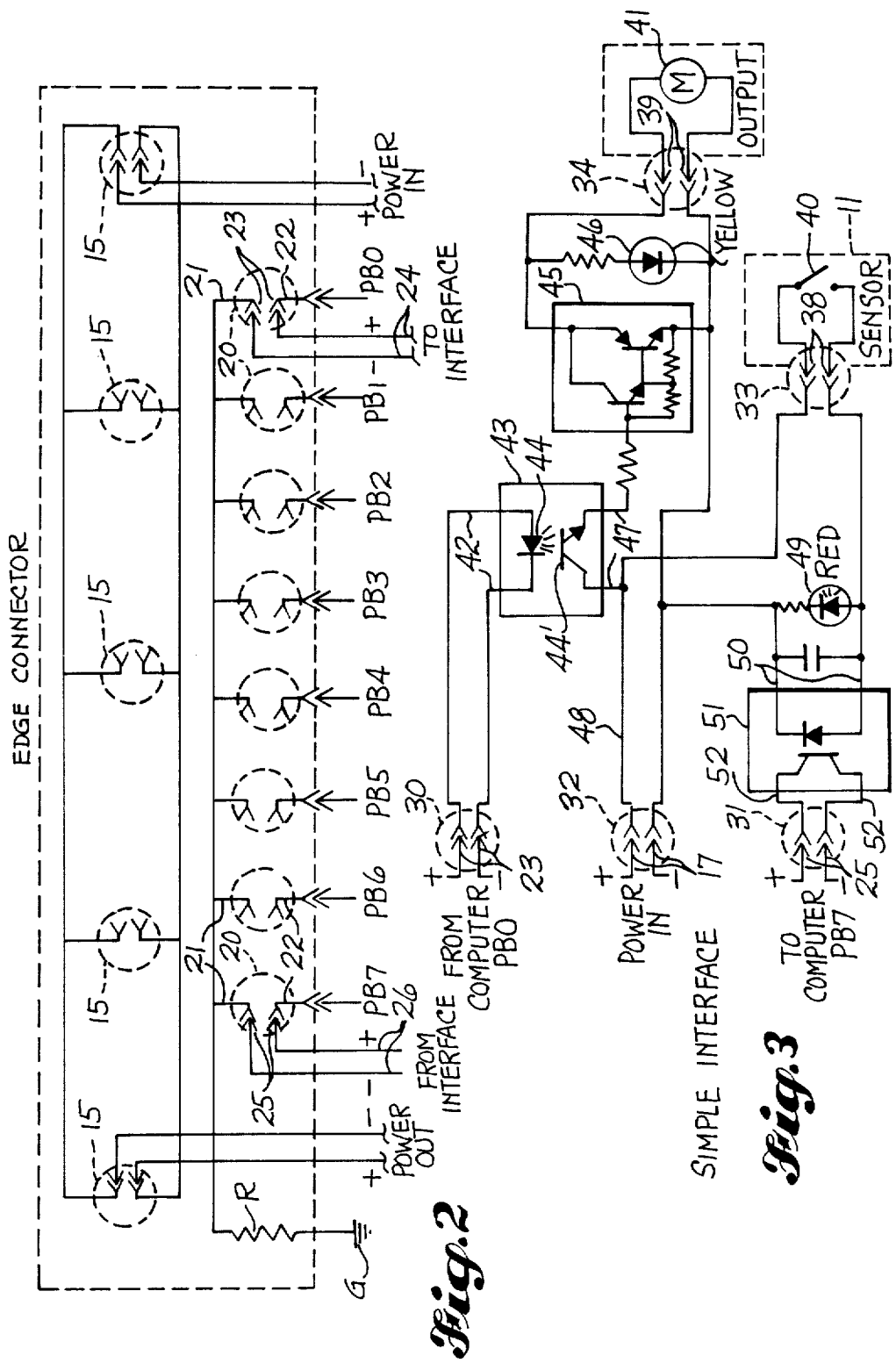
FIG. 2 is a very schematic circuit diagram of the edge connector shown in FIG. 1.
FIG. 3 is a very schematic circuit diagram of the interface shown in FIG. 1.

The general configuration of the edge connector 3 is shown in FIG. 1 and the circuit of such connector is shown in FIG. 2. The edge connector includes two independent circuits, one for receiving electrical power and conveying the power to the interface 10 and the other for conveying signals to and receiving signals from the input and output pins of the computer user port 2.

As seen in FIG. 2, the power receiving and conveying circuit consists of a series of double-pole electrical jacks 15 connected in parallel and adapted to receive conventional double-pole plugs, such as the plugs 16 and 17 shown in FIG. 1. The power input plug 16 shown in FIG. 1 can be inserted into one of such jacks to transfer power to the circuit from the conventional transformer 18, preferably about 5 volts DC. The power output plug 17 can be inserted into one of the other jacks and, through wires 19 and another identical plug 17, convey the power to the interface 10. Consequently, there is a continuous supply of power to the interface.

Returning to FIG. 2, the other circuit of the edge connector 3 includes a separate conventional double-pole electrical jack 20 for each of the user port pins. Using the Commodore 64 terminology, the pins are numbered PB0 through PB7. One lead 21 of each jack is connected to ground G through a resistor R and the other lead 22 of each jack is connected to its pin. In the preferred embodiment of the present invention, one of the pins configured by the computer as an output, pin PB0, is connected to the interface 10 by the conventional plugs 23 and wires 24 as seen in FIG. 1. Another of the pins designated as an input, pin PB7, is connected to the interface by by conventional plugs 25 and wires 26.

The voltage supplied by the computer to the output pin PB0 corresponds to the value of the eighth or last bit of the user port memory address. The value of the first bit at such address corresponds to the voltage at the input pin PB7.

Simple Interface

The circuit for the interface 10 represented in FIG. 1 is shown diagrammatically in FIG. 3 and is best described with reference to its operation. The interface has conventional electrical jacks 30, 31, 32, 33 and 34 for, respectively, the output plug 23 connected to user port output pin PB0, the input plug 25 connected to the user port input pin PB7, the power input plug 17 from the power supply circuit of the edge connector, the plug 38 from the sensor (which is shown as a simple switch 40 consistent with FIG. 1) and the power output plug 39 for the robot "output" (which is shown as a motor 41 consistent with FIG. 1).

The high or low voltage from the computer output pin PB0 is applied at the light-emitting diode input leads 42 of an opto-insolator 43. A high voltage between such leads causes the LED 44 to glow which actuates the phototransistor 44' of the opto-isolator to act essentially as a closed circuit. Actuation of the transistor completes the circuit loop from the positive power input lead 48 of the power input jack 32 through the transistor 44', a power transistor circuit 45, the motor 41 and back to the negative power lead of jack 32. If the voltage from the computer output pin PB0 is low, there is essentially an open circuit between the opto-isolator output leads 47 so that no power is supplied to the motor. Another LED 46 is connected between the motor leads and will glow during the time that a high voltage signal is supplied by the user port output pin PB0.

With respect to the bottom portion of the circuit shown in FIG. 3 for the sensor 11, if the sensor switch 40 is closed, the circuit loop from the positive power input lead 48 through the sensor switch and light-emitting diode 49 is completed and voltage is applied between the LED input leads 50 of a second opto-isolator 51. Consequently, there is essentially a closed circuit between the output leads 52 of opto-isolator 51 which, with reference to FIG. 2, results in connecting the user port input pin PB7 to ground G for a "low" input voltage signal.

With the sensor switch open, as shown in FIG. 3, there is no input voltage to opto-isolator 51 and the voltage at the PB7 input pin will be high. The light-emitting diode 49 connected between the opto-isolator input leads 50 will glow whenever the sensor switch is closed.

In summary, the simple interface accepts one high and low output signal from the computer which controls whether or not power is supplied through the interface to the robot. For the simple car shown in FIG. 1, whenever a high output signal is received from the computer, the motor will be actuated to drive the rear wheels. Otherwise, the car remains stationary.

In addition, the interface senses whether or not the switch of sensor switch 11 is open or closed and signals the computer by grounding the computer input pin PB7 when the switch is closed.

The LEDS 46 and 49 are useful in tracing the cause of a malfunction, such as a loose motor connection or a loose sensor connection.

Simple Interface Proqramming

In the Commodore 64 computer, the memory address corresponding to the user port is located at "56577". As noted previously, each of the eight bits at such memory address corresponds to the voltage at one of the eight pins PB0 through PB7 of the user port.

It is convenient for the first software instruction to designate this address by a reference numeral or letter. By using the command

D=56577 such memory address can thereafter be referred to in the programming as "D".

The data direction register for the Commodore 64 computer is at memory address 56579. Preferably only one of the user port output pins, pin PB0, is configured as an output which can be effected by the command

POKE 56579,1

This command results in the bits of the data direction register being configured as the decimal number 1 so that the binary bits are, respectively, 0 0 0 0 0 0 0 1. A "0" designation means that the corresponding user port pin is treated as an input and a "1" designation means that the corresponding user port pin is treated as an output. For "00000001", all computer user port pins except the last pin, PB0, would be treated as inputs.

To simplify the programming, only one input is actually provided to the computer, which preferably is the first user port pin PB7 corresponding to the first bit at memory address 56577.

After the initial instructions given above, the remainder of the programming is written by the student user. The command

POKE D,1 results in the last bit of memory address "D" (56577) having a value of "1" so that a high voltage is supplied at the user port output pin PB0. For the simple car shown in FIG. 1, this would result in the car being driven forward.

The command

POKE D,0 results in the last bit of memory address D being "0" which would result in stopping the vehicle.

In a program, commands for actuating action of the robot can be combined with commands controlling operation of the computer. For example, the simple program 10 D=56577, POKE 56579,1 [initial commands]
20 POKE D,1 [actuate robot]
30 FOR W=1 TO 50:NEXT W [delay]
40 POKE D,0 [turn off robot]
50 FOR W=1 TO 50:NEXT W [delay]
60 GOTO 20 [return to instruction 20]

would cause the robot output to be actuated for the period required for the computer to execute the "FOR W=1 TO 50:NEXT W" command and then to be turned off for the same period, whereupon it again would be actuated.

Similarly the command

INPUT X causes the computer to wait until the "ENTER" or "RETURN" key of the computer is pressed before going to the next program instruction and can be used to stop execution of the program at a specified point.

As another example, the computer can be programmed to display or type a message selected by the programmer at any specified point in the program.

With respect to the operation of the sensor, the computer is actuated to check the status of those user port pins designated as inputs by the command "PEEK". For the initial instructions given above and with only the first user port pin PB7 being actually used as an input, the last or "output" bit at memory address "D" (56577) will be 0 or 1 depending on whether or not an output signal is being sent to the interface, the first bit will be 0 or 1 depending on whether or not user port pin PB7 is grounded by closing of the sensor switch, and all of the other bits will be 1 because they are configured as inputs but not grounded. More specifically, with the sensor switch open, the first bit will be 1, the next six bits will be 1 and the last bit will be 0 or 1, that is, memory address "D" will be

11111110 or

11111111 which correspond to decimal numbers 254 and 255, respectively.

With the sensor switch closed, however, the configuration of memory address "D" will be

01111110 or

01111111 which correspond to decimal numbers 126 and 127, respectively.

For simplicity, a decimal number above or below 200 existing at memory address "D" can be selected as indicating whether or not the sensor switch is closed. The programming instruction

IF PEEK D<200 THEN GOTO 100 results in the computer advancing or returning to instruction or command "100" if the sensor switch is closed. For the simple car shown in FIG. 1 and for which the sensor switch is closed when the car strikes an object, command "100" might be

REM [REMARK] I HIT SOMETHING so that the computer would display "I HIT SOMETHING" if it detected closing of the switch.

Multiple Interface

Figure 4:
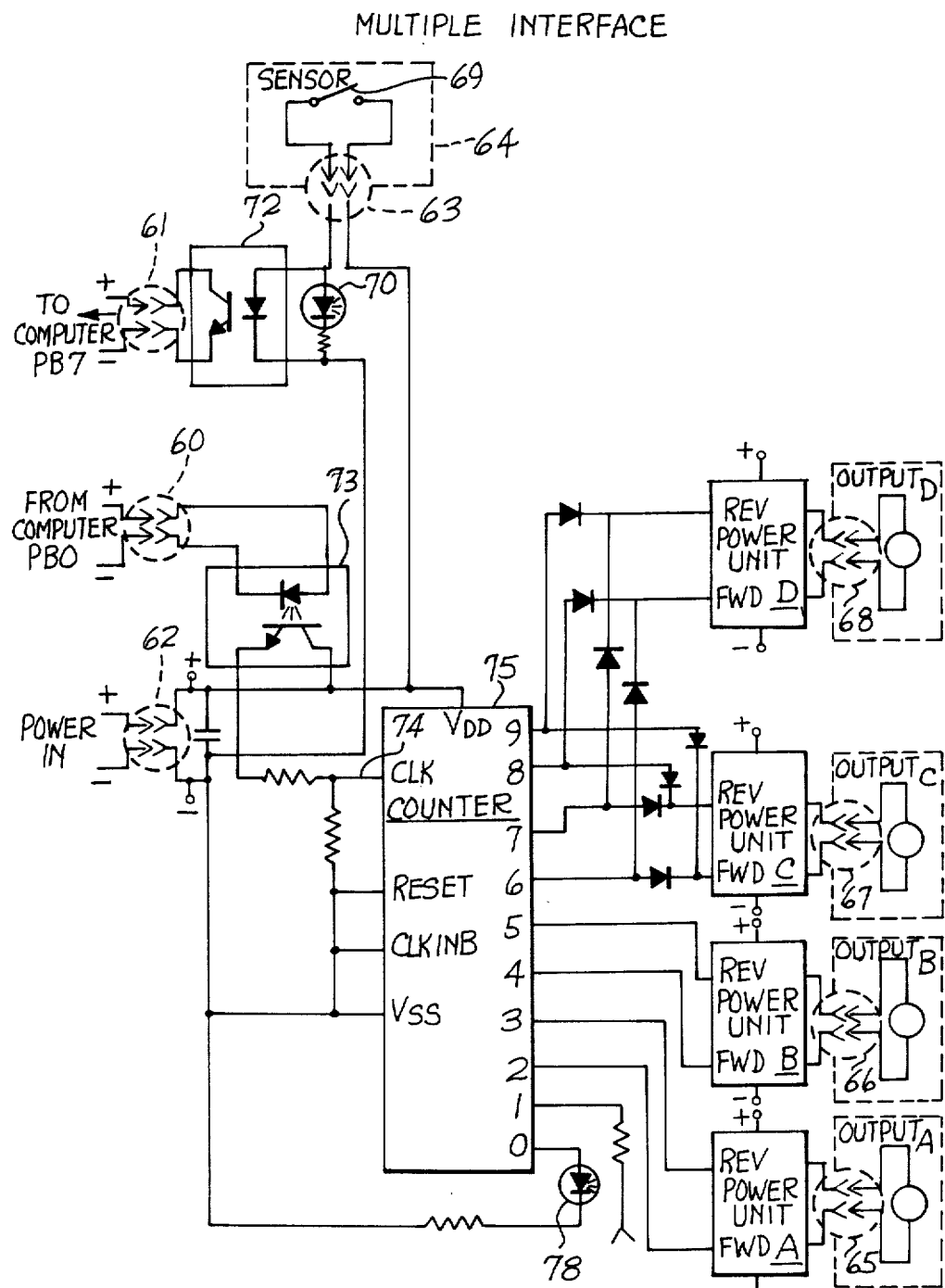
FIG. 4 is a very schematic circuit diagram of a more complicated interface that can be used in the computer controllable robotic educational toy in accordance with the present invention.

FIG. 4 shows diagrammatically the circuit of a more complicated and more versatile interface, referred to as the "multiple interface", that can provide independent power outputs to a robot having more than one electrically-powered action. Similar to the circuit of the simple interface shown in FIG. 3, the multiple interface shown in FIG. 4 has a single jack 60 for receiving the signal from the computer output pin PB0, a single jack 61 for sending a signal to the computer input pin PB7, a single power-receiving jack 62 and a single jack 63 for connection to a sensor 64. Unlike the simple interface, however, the form of the multiple interface shown in FIG. 4 has four independent robot power output jacks 65, 66, 67 and 68, respectively.

The sensor portion of the multiple interface circuit shown toward the top of FIG. 4 is identical to the sensor portion of the simple interface circuit shown toward the bottom of FIG. 3. Specifically, closing of the sensor switch 69 completes the power loop through the switch, light-emitting diode 70 and a resistor, causing a closed circuit between the output leads 71 of an opto-isolator 72 and grounding the computer input pin PB7. With the sensor switch open, there is an open circuit between the opto-isolator output leads so that the voltage at the computer input pin PB7 remains high.

Also similar to the simple interface circuit, in the multiple interface circuit a high voltage signal from the computer output pin-PB0 actuates another opto-isolator 73 but, in the case of the multiple interface, actuation of opto-isolator 73 results in power being supplied to the "clock" input 74 of a conventional electronic counter 75. The counter always supplies a high output voltage to only one of its 10 outputs which are shown in FIG. 4 arranged vertically at the right of the counter and numbered 0 through 9. Each time a signal is received at its clock input, the counter is sequenced one unit and the high output voltage is supplied to the next higher numbered output. For example, beginning with the counter supplying a high voltage at its "0" output, the next time a high voltage signal is received at the clock input, the counter sequences to supply the high voltage at its "1" output. The counter sequences from 0 through 9 and then begins again at 0.

For the multiple interface circuit shown in FIG. 4, the "2" and "3" outputs of the counter serve as the "forward" and "reverse" inputs to a "power unit" A for which the circuit is shown diagrammatically in FIG. 5. As seen in FIG. 5, such power unit includes two pairs of power transistors controlling the supply and orientation or direction of power at the robot power output jack 65. Each power transistor acts as a switch, transistors 80 and 81 being actuated to act as closed circuits only when a high voltage is supplied at the "forward" power unit input which is from the "2" output of the counter, and transistors 82 and 83 being actuated to act as closed circuits only when a high voltage is supplied at the "reverse" power unit input which is from the "3" output of the counter. The negative and positive power connections 84 and 85, respectively, of the power unit are connected to the multiple interface power input jack 62 shown in FIG. 4.

As seen in FIG. 6, a high voltage at the power unit forward input results in the positive power connection 85 being connected to the upper robot power output lead 86 and the negative power connection 84 being connected to the lower robot power output lead 87 which, for purposes of reference, is designated as the "forward" orientation. As seen in FIG. 7, a high voltage at the "reverse" power unit input results in the positive power connection 85 being connected to the lower robot power output lead 87 and the negative power connection 84 being connected to the upper robot power output lead 86, which is designated as the reverse orientation.

Returning to FIG. 4, three other power units B, C and D, respectively, each identical to power unit A, are connected to counter outputs 4 and 5, 6 and 7, and 8 and 9, respectively, so that, for example, high voltage at the counter "4" output results in power of forward orientation at robot power output jack 66, whereas high voltage at the counter "5" output results in power of reverse orientation at such jack.

In addition, the inputs for power units C and D are interconnected by a network of diodes incorporated in the multiple interface for the purpose of simplifying operation of a vehicle having independently drivable wheels of the type described below. The effect of the diode network is that a high voltage from the "6" counter output is applied to both forward inputs of power units C and D; a high voltage from the "7" counter output is applied to the reverse inputs of both power units C and D; a high voltage from the "8" counter output is applied to the reverse input of power unit C and the forward input of power unit D; and a high voltage from the "9" counter output is applied to the forward input of power unit C and the reverse input of power unit D.

A representative robot usable with the multiple interface is shown in FIG. 8. Such robot includes a pair of standard Capsela wheels 90 and 90' driven independently by direct current motors of modules 91 and 92. The two-wheel vehicle has the standard Capsela counterbalancing bulbs or floats 93 and the multiple interface 94 is conveniently configured to be attached over the motor modules. For the purposes of this discussion, the lower motor driving wheel 90 corresponds to output C in FIG. 4, the upper motor driving wheel 90' corresponds to output D and movement of the vehicle generally toward the viewer is designated as "forward". In this configuration, a high voltage at the "6" counter output drives both motors to move the car forward. A high voltage at the "7" counter output drives both motors to move the car in reverse. A high output at the "8" counter output drives the upper wheel forward and the bottom wheel in reverse to turn the vehicle sharply to the right. A high voltage at the "9" counter output drives the lower wheel forward and the top wheel in reverse to turn the car sharply to the left.

As seen in FIG. 8, preferably the multiple interface has a separate green LED 76 above each of its output jacks 65, 66, 67 and 68 which glows if its jack is actuated to provide power of forward orientation and a separate red LED 77 which glows if its jack is actuated to provide power of reverse orientation. For simplifying the circuit diagram, these light-emitting diodes have not been shown in FIGS. 4 through 7. Yellow LED 70 glows if the sensor is actuated to result in grounding the computer input pin PB7.

Multiple Interface Programming

Software used with the multiple interface is complicated only by the programmer assuring that the multiple interface is "POKED" a number of times appropriate for actuating the desired output and thereby implementing the desired electrically-powered action of the robot. There is no working output to the robot if the counter is supplying a high voltage to its "0" or "1" output and, preferably, one of these outputs actuates a light-emitting diode 78—output 0 of the counter, as seen in FIG. 4—for the reference of the programmer. The command

POKE D,1:POKE D,0 results in sequencing the counter to provide the high voltage to the next output. Subroutines can be incorporated for jumping from one output to the desired output.

Alternative Sensors

A variety of different types of sensors can be used to detect whether or not a preselected condition exists at the robot, some of which are shown in FIGS. 9, 10, 11 and 12.

The simple switch-type sensor shown in FIG. 9 is referred to in the above description and includes a switch normally open but closed by depressing a button 100 over which the pivoting lever arm 12 extends.

The sensor shown in FIG. 10 includes a photosensitive resistor mounted in a tube 101 connectible to one of the Capsela modules. The resistor normally has a high value sufficient for the purposes of the present invention to act as an open circuit except when bright light is directed into the open end of the tube, whereupon the value of the resistor decreases sufficiently that it acts as a closed circuit.

Similarly, the sensor shown in FIG. 11 is a sound-sensitive resistor normally having a high value sufficient that it acts as an open circuit except when a sharp noise, such as a handclap, is detected which lowers the value of the resistor sufficiently that it acts as a closed circuit.

The circuit of the sensors shown in FIGS. 10 and 11 can be diagrammatically represented as shown in FIG. 13 where the variable resistor R' acts either as an open or a closed circuit. Each sensor has a jack for a wired plug to connect the sensor to one of the interfaces.

With respect to the sensor shown in FIG. 12, such sensor includes a magnetic reed switch 102 mounted on a standard Capsela connector for positioning the switch adjacent to a wheel. The wheel has been modified to carry a permanent magnet 103 which, by rotation of the wheel, moves past the switch. The switch is normally open but is closed each time the magnet passes the switch. The appropriate "PEEK" statements can be used to detect closing of the switch. The computer can be programmed to count the number of times that the switch is closed, so that the computer will jump to a specified instruction after a desired number of revolutions of the wheel, for example.

Alternative Outputs

Although described with reference to wheel-driving motors used as the outputs or electrically-powered actions actuated by the interfaces, a variety of other types of electrically-powered actions can be used.

For learning and perfecting the simple programming techniques used initially, a simple DC light can be the output or electrically-powered action, with a student instructed, for example, to write a program that will cause the light to be turned on, or to be turned on and then off, or to be turned on and off at specified intervals, or to be turned on each time the "ENTER" key is pressed, or to be turned on upon actuation of a sensor such as the manual switch, and so on.

After the simpler programming techniques have been mastered, the student can move on to construction and operation of a simple car such as that shown in FIG. 1 using the simple interface.

Thereafter, the student can practice more complicated programming for operating two separate wheel-driving motors by use of the multiple interface.

Then additional types of outputs or electrically-powered actions can be introduced, such as the mechanical claw shown in FIG. 14. Such claw includes a baseplate 110 carried by a standard Capsela connector and having a threaded central hole for a threaded spindle 111 turned by actuation of the motor of a Capsela motor module 112. Driving the spindle in one direction moves a nut 113 lengthwise along the spindle to spread or draw together the inner links 114 of pairs of parallel links pivoted to the opposite ends of the baseplate and to the opposing claw tips 115. With the multiple interface for which the circuit is shown in FIG. 4, power units C and D could be used for opposing wheels of a vehicle carrying, for example, the claw of FIG. 14 to be driven by power unit B, and a headlight driven by power unit A. The sensor shown in FIG. 12 would allow jumping to a desired instruction after a predetermined number of revolutions of one of the vehicle wheels.

Additional Activities

As the student user learns the basic programming instructions required to cause a desired action of the robot and also learns the effect of each programming instruction, still more complicated robots can be constructed.

For example, with respect to the simple interface for which the circuit is shown in FIG. 3, an additional simple interface could be connected to receive a signal from pin PB1 which also could be configured as an output; or a multiple interface could be connected to pin PB0 and a simple or multiple interface connected to pin PB1. As the binary principles controlling the action of the sensor inputs are learned, additional sensors from other interfaces can be connected to the other user port pins.

While the present invention is intended to be used initially with an instruction manual and a fairly structured learning experience where the student is directed to follow a predetermined series of experiments or activities, it has been found that after the basic principles have been learned, it cannot be expected that investigative or innovative students will continue to follow a structured learning experience. Rather, it is common for students to deliberately connect the interface or interfaces in other than the intended manner and then calculate or experiment with programming instructions that will result in a desired action of the robot.

Alternative Circuits

A primary advantage of the computer controllable robotic educational toy in accordance with the present invention is that only a single high or low voltage signal from the computer is required in order to control the action of a robot, and only a single input is provided to the computer. Consequently, the interface circuits can take various forms.

The invention has been described with reference to interfaces having jacks for wired plugs; the use of a single output pin permits remote signaling between the computer and the robot with single frequency radio or infrared devices.

Other Computers

While described with reference to the Commodore 64 computer, the present invention requires only slight modification for use with other personal or home computers having ports accessible by the user. The Apple II computer has a game port accessible by a multiple-pole plug. Using the Apple II terminology, the voltage at pin "AN0" can be controlled by "POKE" instructions to memory addresses 49240 and 49241. Designating address 49241 as "A" and 49240 as "B", the instruction

POKE A,1 will result in a high voltage at pin AN0 and the command

POKE B,1 will result in a low voltage at pin AN0.

Still using the Apple II terminology, pin "PB2" can be used as the sensor input with a simple circuit normally feeding a high voltage to such pin but grounding it when, for example, the robot sensor switch is closed. The high or low voltage at pin PB2 can be detected by checking the value of memory address 49251. If the decimal value at such address is less than 128, then pin PB2 is grounded which indicates that the sensor switch is closed, whereas if the decimal value at such address is greater than 128, then the pin has a high voltage which indicates that the sensor switch is open.

I claim:

1. In a computer-controllable robotic device using a multipurpose microcomputer including an output port having several discrete input and output contacts, such microcomputer having programming modifiable to control the computer to provide a high or low voltage output signal to a selected single output contact of such port, and a robot having a plurality of different electrically-powered actions, the improvement comprising an interface operably connectable between such microcomputer port and such robot and including power-controlling means for receiving the output signal from such selected single output contact of the microcomputer port and for supplying electric power to the robot for effecting various different selected electrically-powered actions of the robot as determined by the programming of the microcomputer without reference to or being affected by the voltage at any other output contact of the microcomputer output port.

2. In the device defined in claim 1, the interface including an electronic counter actuated by the high or low voltage output signal from the selected single contact of the computer port, said counter having a plurality of output connections no more than one of which is actuated at any selected time, said counter being sequenced by the high or low voltage output signal from the selected single contact of the microcomputer port to change which of its outputs is actuated, and the robot being connected to said counter so that different electrically-powered actions are effectd by actuation of different outputs of said counter.

3. In the device defined in claim 1, the programming also being modifiable to control the computer to detect a high or low voltage signal at a selected single input contact of the port, the robot having a sensor for detecting whether or not a preselected condition exists at the robot, and including sensor-actuated means controlled by the sensor for providing a signal to only such selected single input contact of the microcomputer port to indicate whether or not the preselected condition exists at the robot.

4. The device defined in claim 3, in which the sensor-actuated means includes an electric circuit for detecting when the preselected condition is sensed by the sensor and for grounding the selected single input contact of the computer port when ever the preselected condition is sensed by the sensor.

5. In a computer-controllable robotic device using a multipurpose microcomputer including an output port having a plurality of discrete input and output contacts, such microcomputer having programming modifiable to control the computer to provide a high or low voltage output signal to a selected single output contact of such port, and a robot having a plurality of different electrically powered actions, the improvement comprising an electric power supply separate from the microcomputer, and an interface operably connectable between the microcomputer port, such robot and said electric power supply, said interface including power-controlling mean for receiving the output signal from such selected single output contact of the microcomputer port and for controlling conveyance of electric power from said separate electric power supply to the robot for effecting various different selected electrically powered actions of the robot as determined by the programming of the microcomputer without reference to or being affected by the voltage at any other output contact of the microcomputer output port.

6. In a computer-controllable robotic device using a multipurpose microcomputer including an output port having a plurality of discrete input and output contacts, such microcomputer having programming modifiable to control the computer to provide a high or low voltage output signal to a selected single output contact of such port, and a robot vehicle having at least two wheels driven, respectively, by separate electric motors, the improvement comprising an interface operably connectable between such microcomputer port and such robot and including power-controlling means for receiving the output signal from such selected single output contact of the computer and for supplying electric power to the motors so as to selectively control said motors to drive the vehicle forward or in reverse or to turn the vehicle in one sense or in the opposite sense as determined by the programming of the microcomputer without reference to or being effected by the voltage at any other output contact of the microcomputer output port.

7. In a computer-controllable robotic device using a multipurpose microcomputer including an output port having several discrete contacts, such microcomputer having programming modifiable to control the computer to provide a high or low voltage output signal to a selected single output contact of such port, and a robot vehicle having at least two drive wheels and separate electric motors for driving said wheels, respectively, the improvement comprising an interface including an electronic counter actuated by the high or lower voltage output signal from the selected single output contact of the computer port, said counter having at least four output connections no more than one of which is actuated at any selected time, said counter being sequenced by the high or low voltage output signal from the selected single output contact of the microcomputer port to change which of its outputs is actuated, and an electrical control circuit connected between said counter and the vehicle motors and having first, second, third and fourth separate inputs each connected to a separate output connection of said counter, actuation of said first input of said control circuit being effective to power said motors so as to drive both of said robot vehicle drive wheels in a forward direction, actuation of said second input of said control circuit being effective to power said motors so as to drive both of said vehicle wheels in a reverse direction, actuation of said third input of said control circuit being effective to power said motors to drive said vehicle wheels to turn said robot vehicle in a first sense and actuation of said fourth input of said control circuit being effective to power said motors so as to drive said vehicle wheels to turn said robot vehicle in the sense opposite the first sense.

8. The process of operating a robot having at least two different electrically powered actions, which process comprises:
  programming a multipurpose microcomputer to provide a high or low output voltage at a first selected single output contact of a port of the microcomputer accessible to the user;
  receiving such output signal from such first contact and using it to actuate a supply of electric power to the robot to effect, consecutively, different electrically powered actions as determined by the programming of the microcomputer and without reference to or being effected by the voltage at any other output contact of the microcomputer port.

9. The process of operating a robot vehicle having at least two wheels driven, respectively, by two different electric motors which comprises:
  programming a multipurpose microcomputer to provide a high or low voltage output signal at a first selected single contact of a port of the microcomputer accessible to the user;
  receiving such output signal from such first contact and using it both to actuate and to control the direction of both motors for driving the robot vehicle forward, in reverse or for turning such vehicle to the right or to the left as determined by the programming of the microcomputer and without reference to or being affected by the voltage at any other output contact of the microcomputer port.

* * * * *